Patented Sept. 4, 1945

2,383,965

UNITED STATES PATENT OFFICE 2,383,965

PROCESS FOR THE CONDENSATION OF KETENE WITH KETONES

Bernard H. Gwynn, Oakmont, Pa., and Edward Franklin Degering, La Fayette, Ind., assignors to Purdue Research Foundation, La Fayette, Ind., a corporation of Indiana No Drawing. Application September 23, 1942, Serial No. 459,448

10 Claims. (Cl. 260—488)

Our invention is concerned with a process for the condensation of ketene with ketones to produce unsaturated acetates wherein the alcohol component of the ester molecule contains the same number of carbon atoms as the ketone with which the ketene reacted. More specifically, our invention is concerned with a process for the condensation of ketene with ketones of the following general formula:

wherein R may represent a member selected from the group consisting of aryl, alkaryl, heterocyclic, alkylene, and alkyl; $R^1$ may be either alkaryl, an alkyl group having at least one hydrogen attached to the carbon atom thereof, which is adjacent the carbonyl group, or —$CH_2$—Ar, in which Ar is an aromatic nucleus; and R and $R^1$ combined represent the group

said group being a saturated carbon chain, the terminal carbon atoms of which are singly bonded to C.

Some ketones included by the above general formula and suitable for our process are: acetone, methyl ethyl ketone, methyl isobutyl ketone, methyl amyl ketone, methyl hexyl ketone, disisobutyl ketone, cyclohexanone, cyclopentanone, acetophenone, mesityl oxide, methyl butyl ketone, phenyl propyl ketone, methyl benzyl ketone, methyl furfuryl ketone, and difurfuryl ketone.

It is a well-known fact that ketene reacts with carboxylic acids, acid chlorides, alcohols, metal alkyls, amines, amino acids, aliphatic hydrocarbons, carbohydrates, gum esters, haloamines, halogens, hydrazines, hydroxylamines, phenols, proteins, and thio-alcohols. In addition, it is known to react with itself. All reported efforts to effect the condensation of ketene with ketones, however, indicate that the reaction cannot be effected. The conclusion drawn by the prior investigators is justified in view of the fact that ketene may be prepared by the pyrolysis of acetone, and no reaction between the two had been evidenced.

We have now discovered a process whereby the condensation of ketene with ketones can be effected by utilizing a small amount of an acid catalyst, preferably, a mineral acid, such as hydrochloric acid, phosphoric acid, sulphuric acid, and the like. The general procedure employed in our new process is to generate ketene, according to any of the suitable methods, and pass it through the desired ketone in the presence of a small amount of catalyst.

The ketene employed in our invention may be prepared in any suitable manner. We prefer, however, to prepare this material by the pyrolysis of acetone. Ketene prepared in this manner will contain a small amount of contaminating acetone, which is not of importance in the reaction utilizing acetone as the ketone, but in the reactions involving other ketones, it is advantageous to remove as much of the contaminating acetone from the gas as is possible. This may be accomplished by passing the ketene through several cold traps in order to condense out the acetone before passing the ketene through the desired ketone.

Insofar as ketene is known to react with itself forming a polymeric product, it is desirable to effect the condensation of ketones with ketene under conditions which favor high yields of the resulting acetate, and at the same time inhibit the formation of polymers. We have found that by varying the catalyst concentration, temperature, and time of reaction as controlled by the rate of addition of ketene, not only are the yields of the acetate increased, but also the ratio of polymerization to acetylation is maintained at a minimum. The optimum reaction conditions will, of course, vary with each particular reaction mixture. Therefore, the effect of varying the reaction conditions will be illustrated with respect to the condensation reaction of ketene with acetone. At low temperatures this reaction proceeds very slowly, but as the temperature is increased, the amount of product formed is accordingly increased; equally as important, the amount of residue or polymeric product is decreased sharply. We have found that temperatures just below the reflux temperature give the best results. Although 55° C. is the maximum temperature possible when reacting acetone and ketene at atmospheric pressure, the temperature may be increased by the utilization of pressure reaction vessels.

The rate of flow of ketene is one of the chief factors which affected the yield since it determines the time required for completion of the reaction. When the rate of flow is slow, the conversion and yields are high, but the time required for completion of the reaction is quite lengthy. As the rate of flow is increased, the percentage yield is increased per unit of time; however, when the rate of flow is exceedingly high the ratio of polymerization to acetylation also increases sharply. We have found, therefore, that higher yields of product are obtained in a shorter period of time, and at the same time the amount of polymeric products formed is relatively low, when the rate of flow is approximately 1,100 parts of ketene per hour for each 6,000 parts of acetone, and the reaction period 3¼ hours.

The proper quantity of acid catalyst will naturally vary with the rate of flow of ketene, and an increased rate of flow, therefore, demands a greater amount of catalyst. When operating at the most desirable rate of flow, described above, we have found that the yield of product and residue increases slowly at about the same rate as the concentration of catalyst is increased. When high concentrations of catalyst are used, however, the ratio of polymerization to acetylation increases sharply, and the yield of product drops off considerably.

Our invention may be further illustrated by the following specific examples:

Example I

Ketene prepared by the pyrolysis of acetone was passed through two cold traps, the first being surrounded by an ice bath, and the second by a dry carbon tetrachloride-chloroform bath kept at −35° C. to −40° C., to remove the acetone from the pyrolysis gas. The acetone-free ketene was then passed through a constantly agitated mixture consisting of approximately 6,000 parts of acetone and 69 parts of sulfuric acid contained in a reaction vessel immersed in an oil bath at a temperature of 55° C., the rate of flow of ketene being approximately 1100 parts per hour. After 3½ hours the flow of ketene was stopped, and the product separated from the reaction mixture by fractional distillation. The yield of 2-acetoxypropene obtained in this manner was found to be 72 per cent.

Example II 1-phenyl-1-acetoxyethene was prepared by reacting acetophenone with ketene for 3½ hours at 65° C., according to the procedure outlined in Example I.

Example III 2-acetoxy-4-methyl-1,3-pentadiene was prepared by reacting mesityl oxide with ketene for 3½ hours at 75° C., according to the procedure outlined in Example I.

Example IV 2,6-dimethyl-4-acetoxy-3-heptene was prepared by reacting diisobutyl ketone with ketene for 5 hours at 110° C., according to the procedure outlined in Example I.

Example V

Cyclohexenylacetate was prepared by reacting cyclohexanone with ketene for 4 hours at a temperature of 110° C., according to the procedure outlined in Example I.

The following data were determined for certain of the acetates prepared as described above.

Table

| Compound | Boiling point, °C. | $n_D^{20°}$ | $d_{20°}^{25°}$ |
|---|---|---|---|
| 2-acetoxypropene | 96 (750 mm.) | 1.4001 | 0.9308 |
| 2-acetoxy-4-methyl-1,3-pentadiene | 57.5 (10 mm.) | 1.4611 | 0.9250 |
| 1-phenyl-1-acetoxyethene | 85 (2 mm.) | 1.5329 | 1.0715 |
| 2,6-dimethyl-4-acetoxy-3-heptene | 74 (12 mm.) | 1.4281 | 0.8541 |
| 2-acetoxy-1-butene | 119 (751.5 mm.) | 1.4114 | 0.9043 |
| Cyclohexenylacetate | 99 (48 mm.) | 1.4573 | 0.9952 |
| 2-acetoxy-4-methyl-1-pentene | 144 (746.5 mm.) | 1.4164 | 0.8695 |
| 2-acetoxy-1-octene | 108 (42.5 mm.) | 1.4283 | 0.8692 |
| 2-acetoxy-1-heptene | 113 (93 mm.) | 1.4262 | 0.7488 |

Our invention is not limited to the specific examples given above, since we have found the reaction to be readily effected between any of the compounds of the type herein disclosed.

The following tabulated experiments utilizing 6000 parts of acetone and 1100 parts per hour of ketene illustrate the effect of catalyst, concentration, temperature, and time of ketene flow upon the yield of 2-acetoxy-propene.

| Parts $H_2SO_4$ | Time, hours | Temperature, °C. | Parts 2-acetoxy-propene |
|---|---|---|---|
| EFFECT OF CATALYST CONCENTRATION | | | |
| 4.75 | 3½ | 55 | 465.4 |
| 9.14 | 3½ | 55 | 1,404.8 |
| 13.77 | 3½ | 55 | 1,954.7 |
| 27.34 | 3½ | 55 | 2,624.8 |
| 36.56 | 3½ | 55 | 3,211.3 |
| 45.7 | 3½ | 55 | 3,443.9 |
| 68.6 | 3½ | 55 | 3,676.7 |
| 90.4 | 3½ | 55 | 3,723.2 |
| EFFECT OF TIME | | | |
| 68.6 | ¾ | 55 | 558.5 |
| 68.6 | 1½ | 55 | 2,038.5 |
| 68.6 | 2½ | 55 | 3,341.6 |
| 68.6 | 3½ | 55 | 3,676.7 |
| 68.6 | 4½ | 55 | 3,946.6 |
| 68.6 | 5½ | 55 | 3,972.5 |
| EFFECT OF TEMPERATURE | | | |
| 68.6 | 2½ | 40 | 2,577 |
| 68.6 | 2½ | 45 | 2,762.5 |
| 68.6 | 2½ | 50 | 2,978.6 |
| 68.6 | 2½ | 55 | 3,341.6 |

Now having described our invention, what we claim is:

1. In a process for the production of enol acetates by the condensation of ketene with ketones, the step which comprises introducing ketene into a ketone selected from the group consisting of acetone, mesityl oxide, acetophenone, diisobutyl ketone, methyl ethyl ketone, cyclohexanone, methyl isobutyl ketone, methyl benzyl ketone, methyl amyl ketone, in the presence of sulfuric acid.

2. In a process for the production of enol acetates by the condensation of ketene with ketones, the step which comprises introducing ketene into a ketone selected from the group consisting of acetone, mesityl oxide, acetophenone, diisobutyl ketone, methyl ethyl ketone, cyclohexanone, methyl isobutyl ketone, methyl hexyl ketone and methyl amyl ketone in the presence of sulfuric acid at elevated temperatures, the rate of flow of ketene through said ketone being approximately ¼ mole per hour per mole of ketone.

3. In a process for the preparation of 2-acetoxy-propene, the step which comprises reacting ketene with acetone in the presence of sulfuric acid.

4. In a process for the preparation of 1-phenyl-1-acetoxyethene, the step which comprises reacting ketene with acetophenone in the presence of sulfuric acid.

5. In a process for the preparation of 2,6-dimethyl-4-acetoxy-3-heptene, the step which comprises reacting ketene with diisobutyl ketone in the presence of sulfuric acid.

6. 2,6-dimethyl-4-acetoxy-3-heptene.

7. In a process for the condensation of ketene with a ketone having at least 3 hydrogen atoms on the carbon atoms adjacent to the carbonyl group to produce enol acetates, the step which comprises reacting said ketone with ketene in the presence of sulfuric acid.

8. In a process for the condensation of ketene with a ketone having at least 4 hydrogen atoms on the carbon atoms adjacent to the carbonyl group to produce enol acetates, the step which comprises reacting said ketone with ketene in the presence of sulfuric acid.

9. In a process for the condensation of ketene with a ketone having at least 2 hydrogen atoms on each carbon atom next to the carbonyl group to produce enol acetates, the step which comprises reacting said ketone with ketene in the presence of sulfuric acid.

10. In a process for the condensation of ketene with a ketone having at least 3 hydrogen atoms on the carbon atoms adjacent to the carbonyl group to produce enol acetates, the step which comprises reacting said ketone with ketene in the presence of a mineral acid selected from the group consisting of sulfuric acid, phosphoric acid, and hydrochloric acid.

BERNARD H. GWYNN.
EDWARD FRANKLIN DEGERING.